(12) United States Patent
Ma

(10) Patent No.: US 10,120,249 B2
(45) Date of Patent: Nov. 6, 2018

(54) ARRAY SUBSTRATE, LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Liang Ma, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 184 days.

(21) Appl. No.: 15/204,906

(22) Filed: Jul. 7, 2016

(65) Prior Publication Data
US 2017/0343873 A1 Nov. 30, 2017

(30) Foreign Application Priority Data
May 27, 2016 (CN) .......................... 2016 1 0367097

(51) Int. Cl.
G02F 1/1343 (2006.01)
G02F 1/1362 (2006.01)
G02F 1/1333 (2006.01)
G02F 1/1368 (2006.01)

(52) U.S. Cl.
CPC ...... G02F 1/136213 (2013.01); G02F 1/1368 (2013.01); G02F 1/13338 (2013.01); G02F 1/133345 (2013.01); G02F 1/136227 (2013.01); G02F 2001/133357 (2013.01); G02F 2001/134318 (2013.01); G02F 2201/121 (2013.01); G02F 2201/123 (2013.01)

(58) Field of Classification Search
None
See application file for complete search history.

(56) References Cited

U.S. PATENT DOCUMENTS

| 8,445,911 | B2 | 5/2013 | Yang et al. | |
|---|---|---|---|---|
| 8,575,612 | B2* | 11/2013 | Lee | H01L 27/1255 257/59 |
| 8,786,815 | B2* | 7/2014 | Lin | G02F 1/133707 349/151 |
| 9,329,444 | B2 | 5/2016 | Nagami | |

(Continued)

FOREIGN PATENT DOCUMENTS

| CN | 103296060A A | 9/2013 |
|---|---|---|
| CN | 103499906A A | 1/2014 |
| JP | 2001281684 A | * 10/2001 |

OTHER PUBLICATIONS

JPO English machine translation of JP2001281684A.*

*Primary Examiner* — Edward Glick
*Assistant Examiner* — David Chung
(74) *Attorney, Agent, or Firm* — Andrew C. Cheng

(57) ABSTRACT

The present application discloses an array substrate, a liquid crystal display panel and a liquid crystal display device; a metal layer is designed to be added between the pixel electrode and the common electrode. The metal layer can form a first storage capacitor with the pixel electrode and formed a second storage capacitor with the common electrode, such as the dual storage capacitors to enlarge the storage capacitor to improve the flicker caused by TFT leakage, ensure the display effect, and the two storage capacitor are overlapped set, the aperture ratio of the pixel is not reduced.

9 Claims, 5 Drawing Sheets

(56) References Cited

U.S. PATENT DOCUMENTS

| | | |
|---|---|---|
| 2008/0192159 A1 | 8/2008 | Ishii |
| 2012/0069257 A1 | 3/2012 | Oh et al. |
| 2014/0141574 A1 | 5/2014 | Zhan et al. |
| 2017/0038887 A1 | 2/2017 | Zhang et al. |
| 2017/0212375 A1* | 7/2017 | Yan ..................... G02F 1/1368 |
| 2017/0212396 A1* | 7/2017 | Cao .................. G02F 1/136213 |
| 2017/0212397 A1 | 7/2017 | Cao |
| 2017/0329173 A1 | 11/2017 | Ding et al. |

* cited by examiner

US 10,120,249 B2

ARRAY SUBSTRATE, LIQUID CRYSTAL DISPLAY PANEL AND LIQUID CRYSTAL DISPLAY DEVICE

FIELD OF THE INVENTION

The present application relates to a display technology field, and more particularly to an array substrate, a liquid crystal display panel and a liquid crystal display device.

BACKGROUND OF THE INVENTION

Thin Film Transistor, TFT is current leakage when applied to the gray scale voltage, resulting flicker phenomenon in Liquid Crystal Display, LCD display, and affect the performance of the display. In order to prevent the gray scale changes of the pixel electrode caused by leakage and improve or avoid flicker, the LCD need to have a larger storage capacitor. But a larger storage capacitor is required two electrodes with larger size, ie, the common electrode and the pixel electrode in the array substrate with larger size, which will undoubtedly reduce the aperture ratio of the pixel.

SUMMARY OF THE INVENTION

In view of this, the present application discloses an array substrate, a liquid crystal display panel and a liquid crystal display device to enlarge the storage capacitor, improve the flicker caused by TFT leakage, and ensure the aperture ratio of the pixel.

An array substrate is provided in the present application, including: a substrate; a TFT, a planarization layer, a common electrode, a passivation layer and a pixel electrode sequentially formed on the substrate characterized in that the array substrate further including a touch panel insulation layer and a metal layer sequentially formed between the common electrode and the passivation layer; wherein the metal layer is electrically connected to the pixel electrode and the drain electrode of the TFT separately; by overlapping disposed, the insulation portion of the touch panel insulation layer and the passivation layer sandwiched by the common electrode and the pixel electrode to form the first storage capacitor; and by overlapping disposed, the insulation portion of the touch panel insulation layer sandwiched by the metal layer and the common electrode to form the second storage capacitor.

Wherein the planarization layer and the touch panel insulation layer have a first contact hole to expose the drain electrode of the TFT and the metal layer is electrically connected to the drain electrode via the first contact hole; the passivation layer has a second contact hole to expose the metal layer and the pixel electrode is electrically connected to the metal layer via the second contact hole.

Wherein a portion of the metal layer is corresponding to locate above the TFT, and another portion of the metal layer is in a stripe type and corresponding to formed above the data line of the array substrate.

Wherein the TFT including a shading metal layer, a buffer layer, a polycrystalline semiconductor layer, an insulating layer, a gate electrode, a dielectric isolation layer, and a source-drain electrode layer formed by a source electrode and a drain electrode.

Wherein the array substrate further including a first conductive layer formed in the same layer and disposed in intervals with the gate electrode of the TFT on the insulating layer; wherein the first conductive layer is located below the drain electrode, the dielectric isolation layer has a third contact hole to expose the first conductive layer, the first conductive layer is electrically connected to the drain electrode via the third contact hole;

the array substrate further including a second conductive layer formed in the same layer and disposed in intervals with the shading metal layer on the substrate; the second conductive layer is located below the first conductive layer; the buffer layer has a fourth contact hole to expose the second conductive layer, the second conductive layer is electrically connected to the polycrystalline semiconductor layer via the fourth contact hole, by overlapping disposed, the insulation layer sandwiched by the polycrystalline semiconductor layer and the first conductive layer to form a MIS storage capacitor.

Wherein the TFT including a gate electrode, a buffer layer, a polycrystalline semiconductor layer, a dielectric isolation layer, and a source-drain electrode layer formed by a source electrode and a drain electrode.

Wherein the array substrate further including a first conductive layer formed in the same layer with the source-drain electrode layer of the TFT and disposed in intervals on the dielectric isolation layer, the first conductive layer is located under the drain electrode, the dielectric isolation layer has a third contact hole to expose the first conductive layer, the first conductive layer is electrically connected to the drain electrode via the third contact hole.

the array substrate further including a second conductive layer formed on the same layer with the gate electrode of the TFT and disposed in intervals on the substrate, wherein the second conductive layer is located below the first conductive layer, the insulating layer has a fourth contact hole to expose the second conductive layer, the second conductive layer is electrically connected to the polycrystalline semiconductor layer via the fourth contact hole, by overlapping disposed, the dielectric isolation layer sandwiched by the polycrystalline semiconductor layer and the first conductive layer to form a MIS storage capacitor of the array substrate.

Wherein the second conductive layer is across the effective display area of the array substrate, and is electrically connected to the common electrode in the peripheral area of the effective display area.

A liquid crystal display panel is also provided in the present application, including the array substrate described above.

A liquid crystal display device is also provided in the present application, including a liquid crystal display panel and a light source module to provide the backlight to the liquid crystal display panel.

The array substrate, the liquid crystal display panel and the liquid crystal display device of the present application have a metal layer designed to be added between the pixel electrode and the common electrode. The metal layer can form a first storage capacitor with the pixel electrode and formed a second storage capacitor with the common electrode, such as the dual storage capacitors to enlarge the storage capacitor to improve the flicker caused by TFT leakage, ensure the display effect, and the two storage capacitor are overlapped set, the aperture ratio of the pixel is not reduced.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
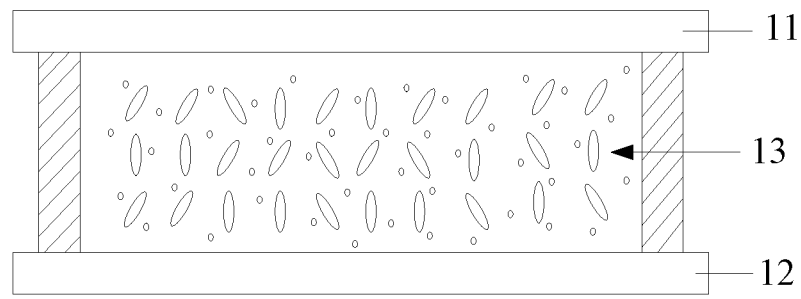
FIG. 1 is a cross-sectional view of the structure of the liquid crystal display panel of one embodiment of the present application.

FIG. 1 is a cross-sectional view of the structure of the liquid crystal display panel of one embodiment of the present application. As illustrated in FIG. 1, the liquid crystal display panel 10 of the present embodiment includes a color filter substrate, referred to as a CF substrate 11, and an array substrate (a thin film transistor substrate, referred to as a TFT substrate 12 formed opposite and spaced. And a liquid crystal (liquid crystal molecules) 13 filled between the two substrates, the liquid crystal 13 are in the liquid crystal cell formed by the overlapped array substrate 12 and the color filter substrate 13.

Figure 2:
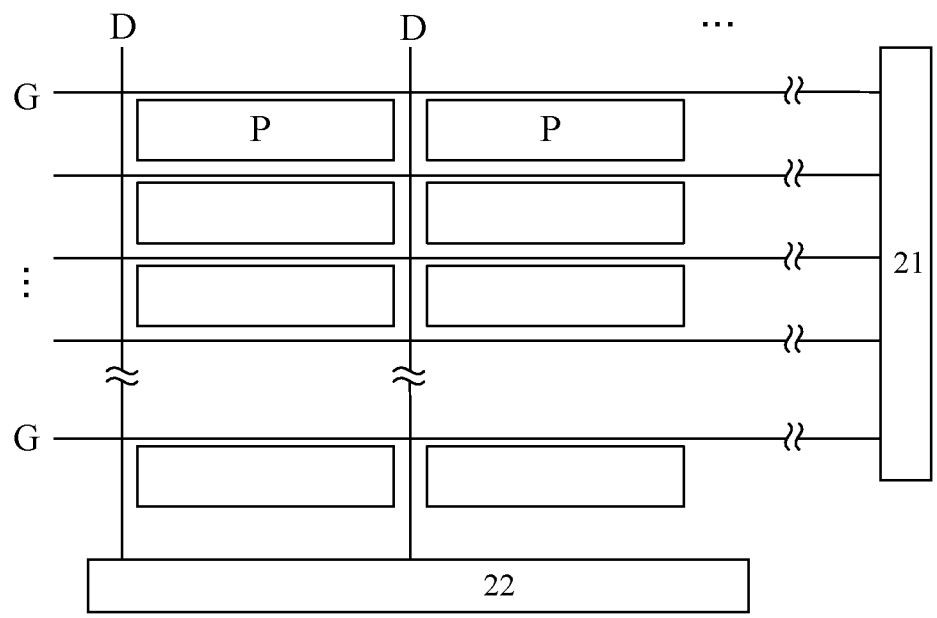
FIG. 2 is a schematic view of the structure of the pixel of one embodiment of the liquid crystal display panel illustrated in FIG. 1.
Figure 3:
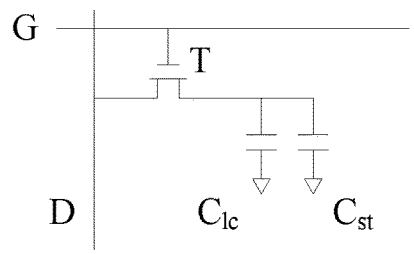
FIG. 3 illustrated the equivalent circuit of the pixel structure illustrated in FIG. 2.

Combined referring to the FIG. 2 illustrated the schematic view of the structure of the pixel of the liquid crystal display panel 10. The array substrate 12 includes a plurality of data lines D formed along the column direction, a plurality of scan lines G formed along the row direction and a plurality of pixel regions P defined by the scanning line G and the data line D. Wherein each pixel region P is connected to a corresponding data line D and a corresponding scanning line G. Each scanning line G is connected to a gate driver 21 to provide a scan voltage to each pixel region P. Each data line D is connected to a source driver 22 to provide a gray scale voltage to each pixel region P. Further combining referring to FIG. 3 illustrated the equivalent circuit of the pixel structure. The array substrate 12 includes a thin-film transistor, TFT, a storage capacitor $C_{st}$ and a liquid crystal capacitor $C_{1c}$. The liquid crystal capacitor $C_{1c}$ is formed by the pixel electrode located in the pixel region P, the common electrode located in the liquid crystal display panel 10, and the liquid crystal 13 between the two electrodes.

According to the display principle of the liquid crystal display panel 10, by input scan voltage to the scan lines G, the TFTs in the same row are simultaneously turned on, and the TFTs in the next row are simultaneously turned on after a certain time, and so on. Since the time to turn on each row of the TFTs is relatively short, the time to charge liquid crystal capacitor $C_{1c}$ and control the liquid crystal 13 deflected is shorter, it is difficult to achieve the response time of the liquid crystal 13. The storage capacitor $C_{st}$ can maintain the voltage of the pixel region P after the TFT is turned off, so as to provide response time to the liquid crystal 13.

Figure 5:
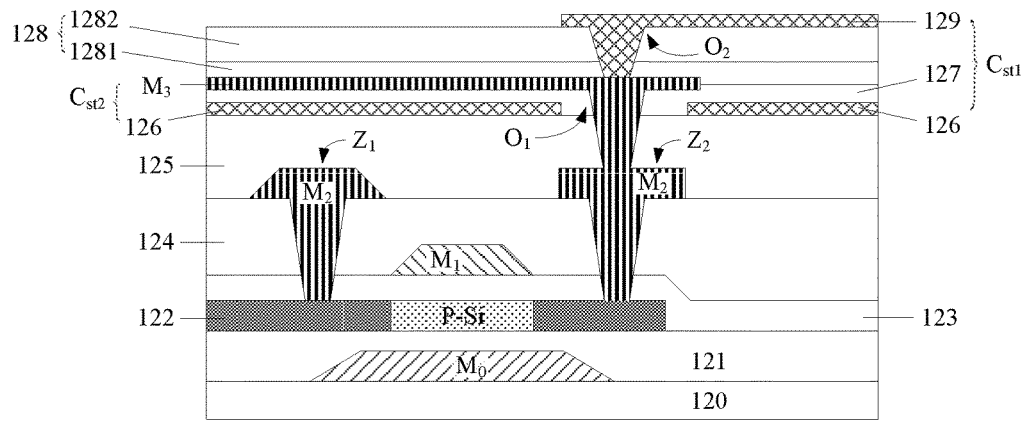
FIG. 5 is a cross-sectional view of the structure along the A-A' line of the pixel zone illustrated in FIG. 4.

The different to the conventional technology is the storage capacitor $C_{st}$ in the embodiment of the present invention includes two storage capacitors, i.e., a first storage capacitor $C_{st1}$ and a second storage capacitor $C_{st2}$ illustrated in FIG. 5.

Figure 4:
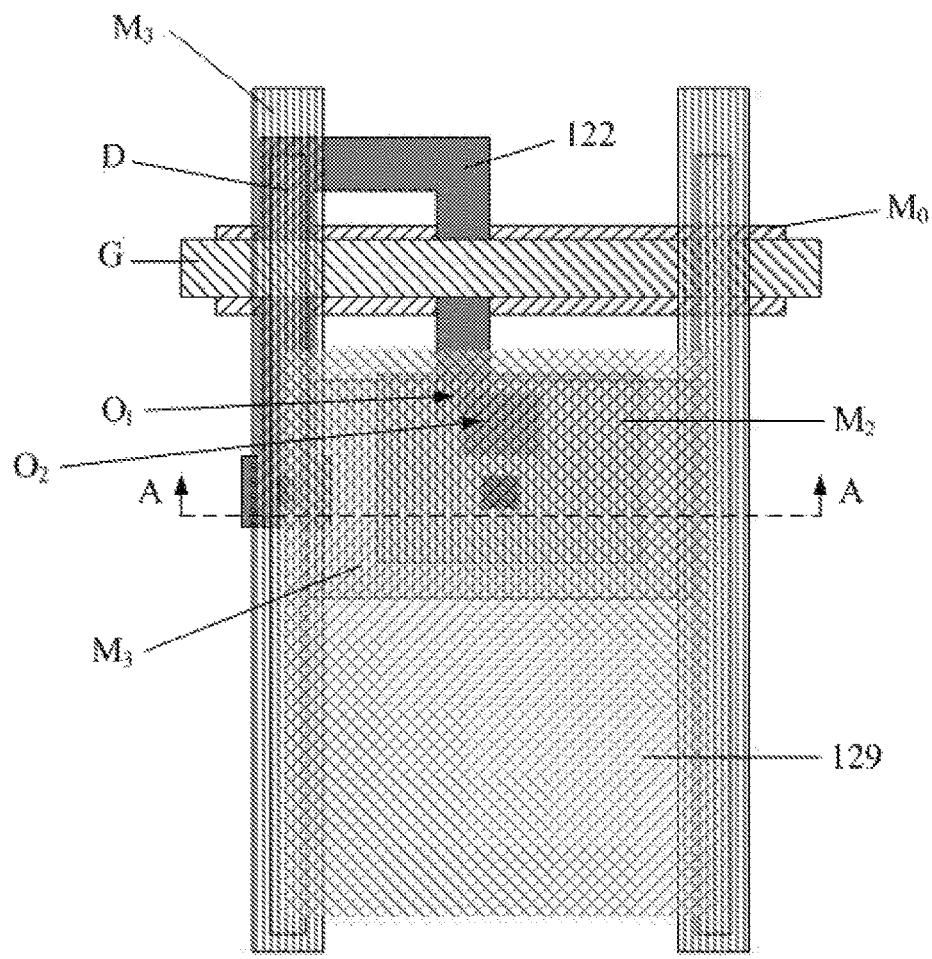
FIG. 4 is a schematic view of the structure of the pixel zone of the array substrate of the first embodiment of the present application.

Combined referring to FIGS. 4-5, the array substrate includes a substrate 120 and a plurality of layer structures sequentially formed on the substrate 120: a shading metal layer $M_0$, a buffer layer 121, a polycrystalline semiconductor (polycrystalline silicon, P—Si) layer 122, an insulating layer, also known as a gate insulation layer, GI 123, a first metal layer $M_1$, a dielectric isolation layer, also known as an interlayer dielectric isolation, ILD layer 124, a second metal layer $M_2$, a planarization layer, PLN 125, a common electrode 126, a touch panel insulation layer, TPIL 127, a third metal layer $M_3$, a passivation layer, PV layer 128 and a pixel electrode 129.

Wherein the second metal layer $M_2$ includes a first zone $Z_1$ and a second zone $Z_2$ formed in the same layer and disposed in intervals on the dielectric isolation layer 124. The second metal layer $M_2$, the first metal layer $M_1$, the polycrystalline semiconductor layer 122, and the insulating layer 123 between the spaces hold by each other and the dielectric isolation layer 124 form the TFT in the array substrate 12. It should be understood that the array substrate 12 in the embodiments of present invention can also include other layer structures, for example, the passivation layer 128 can include a first passivation layer 1281 and a second passivation layer 1282, and the first passivation layer 1281 is formed covering the common electrode 126, and the arrangement to dispose between the other layers in the structure can refer to the conventional technology, and not to be mentioned here.

The first metal layer $M_1$, the first zone $Z_1$ and the second zone $Z_2$ of the second metal layer $M_2$ are corresponding to a gate electrode, a source electrode and a drain electrode of the TFT. Since the shading metal layer $M_0$ is located below the first metal layer $M_1$, and the gate electrode of the TFT is located above the polysilicon semiconductor layer 122, the pixel region P of the present embodiment can be taken as a top gate pixel design.

In the present embodiment, the planarization layer 125 and the touch panel insulation layer 127 have a first contact hole $O_1$ to expose the drain electrode of the TFT. The third metal layer $M_3$ is electrically connected to the drain electrode (the second zone $Z_2$ of the second metal layer $M_2$) of the TFT via the first contact hole $O_1$.

The passivation layer 128 has a second contact hole $O_2$ to expose the third metal layer $M_3$. The pixel electrode 129 is electrically connected to the third metal layer $M_3$ via the second contact hole $O_2$. By overlapping disposed, the insulation portion of the touch panel insulation layer 127 and the passivation layer 128 sandwiched by the common electrode 126 and the pixel electrode 129 to form the first storage capacitor $C_{st1}$. By overlapping disposed, the insulation portion of the touch panel insulation layer 127 sandwiched by the third metal layer $M_3$ and the common electrode 126 to form the second storage capacitor $C_{st2}$.

The first storage capacitor $C_{st1}$ is corresponds to the storage capacitor in the conventional technology. The second storage capacitor $C_{st2}$ is the additional storage capacitor in the embodiment of the present application. That is, a metal layer $M_3$ in the present embodiment of the present application is additional added between the pixel electrode and the common electrode, such that the array substrate has a dual storage capacitors, thereby increasing the storage capacitor of the liquid crystal display panel 10. To improve the flicker caused by TFT leakage, ensure the display effect, and the two storage capacitor are overlapped set, and the aperture ratio of the pixel is not reduced compared to the conventional technology.

Further, referring to FIG. 4 and FIG. 5, a portion of the added third metal layer $M_3$ is corresponding to locate above the TFT, another portion of the third metal layer $M_3$ is in a stripe type and corresponding formed above the data line D 12 of the array substrate 12, and does not reduce the aperture ratio of the pixel. Further, the other portion of the third metal layer $M_3$ can further replace the black matrix, BM to achieve of shading.

Further, the touch panel insulation layer 127 is formed between the third metal layer $M_3$ and the second metal layer $M_2$. It can prevent the second metal layer $M_2$ from being etched during etching and forming the third metal layer $M_3$, and ensure the contact resistance of the electrically connection of the third metal layer $M_3$ and the second metal layer $M_2$ meet the design requirements. Wherein the material of the third metal layer $M_3$ can be the same with each of the material of the the second metal layer $M_2$ or the first metal layer $M_1$, and it can be not the same.

Figure 6:
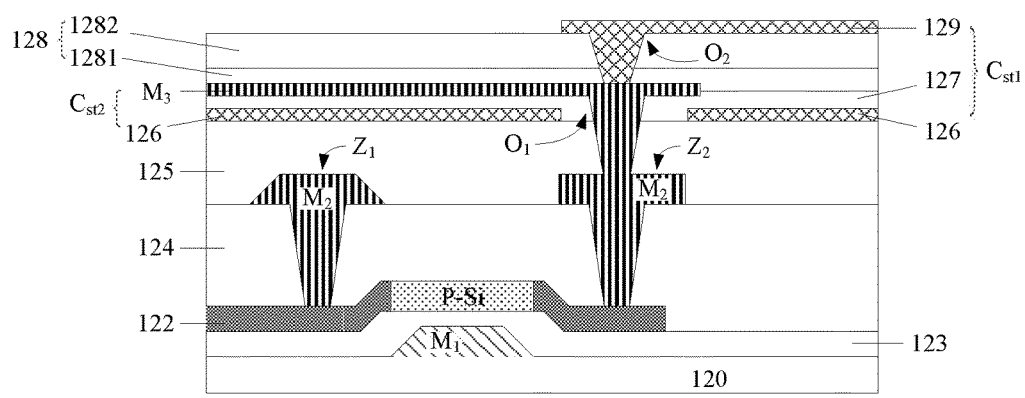
FIG. 6 is a schematic view of the structure of the pixel zone of the array substrate of the second embodiment of the present application.

An array substrate of the second embodiment is also provided in the present invention, to distinguish the difference of the description of the above-described embodiment, which the same reference numerals identical the same structural elements. Referring to FIG. 6, the different between the embodiment in FIG. 5 is the TFT includes a gate electrode (that is the first metal layer $M_1$), a insulation layer 123, a polycrystalline semiconductor layer 122, a dielectric isolation layer 124 and a source-drain electrode layer formed by a source electrode and a drain electrode sequentially formed on the substrate 120. A shading metal layer $M_0$ and a buffer layer 121 are nor formed on the array substrate 12. The gate electrode of the TFT is disposed below the polycrystalline semiconductor layer 122, that is the present invention is also applicable to a bottom gate pixel design of the array substrate 12.

Figure 7:
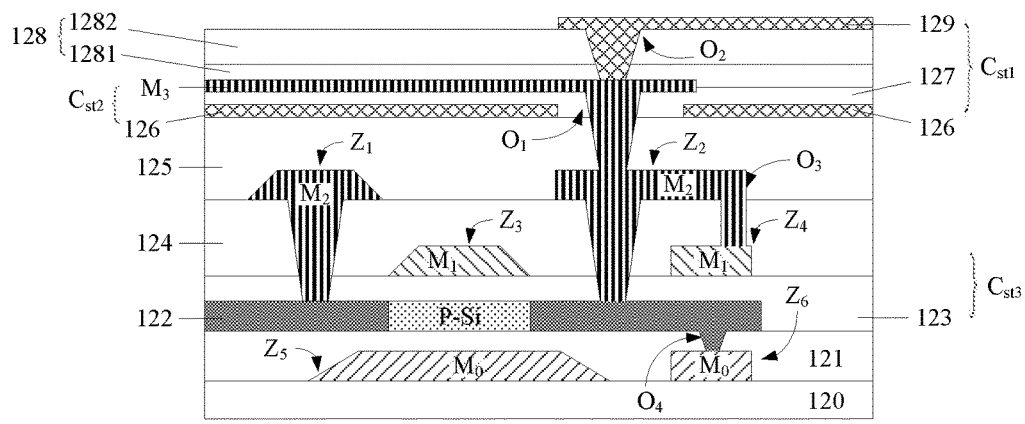
FIG. 7 is a schematic view of the structure of the pixel zone of the array substrate of the third embodiment of the present application.

FIG. 7 is a schematic view of the structure of the pixel zone of the array substrate of the third embodiment of the present application. In order to distinguish the difference of description of the above-described embodiment, which the same reference numerals identical the same structural elements. As illustrated in FIG. 7, the different between the embodiment in FIGS. 4-5 is:

The array substrate 12 further includes a first conductive layer $M_1$ (the fourth zone $Z_4$ shown in FIG. 7) formed in the same layer and disposed in intervals with the gate electrode of the TFT on the insulating layer 123. The first conductive layer $M_1$ is located below the drain electrode. The dielectric isolation layer has a third contact hole $O_3$ to expose the first conductive layer $M_1$. The first conductive layer $M_1$ is electrically connected to the drain electrode via the third contact hole $O_3$. The array substrate 12 further includes a second conductive layer $M_0$ (the sixth zone $Z_6$ shown in FIG. 7) formed in the same layer and disposed in intervals with the shading metal layer $M_0$ on the substrate 120. The second conductive layer $M_0$ is located below the first conductive layer $M_1$. The buffer layer 121 has a fourth contact hole $O_4$ to expose the second conductive layer $M_0$. The second conductive layer $M_0$ is electrically connected to the polycrystalline semiconductor layer 122 via the fourth contact hole $O_4$. By overlapping disposed, the insulation layer 123 sandwiched by the polycrystalline semiconductor layer 122 and the first conductive layer $M_1$ to form the MIS (metal insulator semiconductor) storage capacitor $C_{st3}$.

In other words, the first metal layer $M_1$ of the present embodiment includes a third zone $Z_3$ and a fourth zone $Z_4$ disposed in intervals, the third zone $Z_3$ of the first metal layer $M_1$ is the gate electrode of the TFT, the fourth zone $Z_4$ of the first metal layer $M_1$ is the first conductive layer $M_1$. The dielectric isolation layer 124 has a third contact hole $O_3$ to expose the fourth zone $Z_4$ of the first metal layer $M_1$. The fourth zone $Z_4$ of the first metal layer $M_1$ is electrically connected to the second zone $Z_2$ of the second metal layer $M_2$ via the third contact hole $O_3$ and receive the gray scale voltage from the second zone $Z_2$ of the second metal layer $M_2$. The shading metal layer $M_0$ of the present embodiment includes a fifth zone $Z_5$ and a sixth zone $Z_6$.

The fifth zone $Z_5$ is located below the third zone $Z_3$, and the sixth zone $Z_6$ is located below the fourth zone $Z_4$. The buffer layer 121 has a fourth contact hole $O_4$. The polycrystalline semiconductor layer 122 is electrically connected to the sixth zone $Z_6$ of the shading metal layer $M_0$ via the fourth contact hole $O_4$. The sixth zone $Z_6$ of the shading metal layer $M_0$ is across the effective display area of the array substrate 12 (Active area, AA), and is connected to the common electrode 126 in the peripheral area of the effective display area to receive the common voltage from the common electrode.

In the present embodiment, by overlapping disposed, the insulation portion sandwiched by the polycrystalline semiconductor layer 122 and the fourth zone $Z_4$ of the first metal layer $M_1$ to form the MIS storage capacitor $C_{st3}$ of the array substrate 12 and further enlarge the storage capacitor of the array substrate 12.

Figure 8:
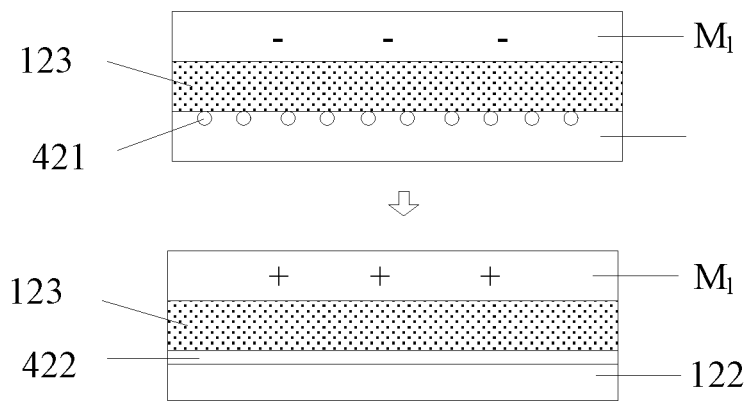
FIG. 8 is a cross-sectional view of the structure of MIS storage capacitor illustrated in FIG. 7.
Figure 9:
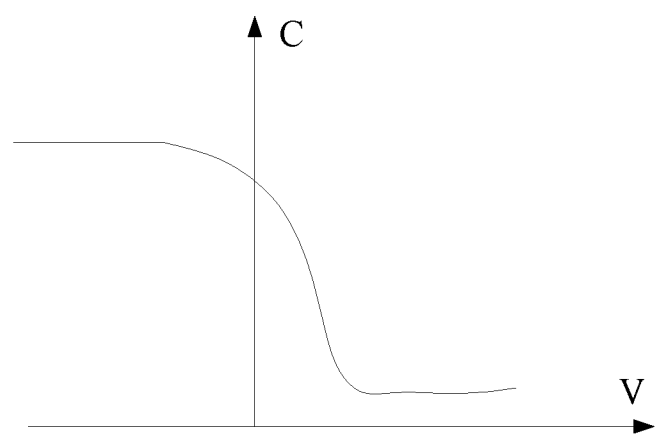
FIG. 9 is a C-V curve of the MIS storage capacitor illustrated in FIG. 8.

Combined referring to FIG. 8, when the side of the first conductive layer $M_1$ side receiving negative gray voltage, the P—Si of the polycrystalline semiconductor layer 122 will be aggregated to form a hole 421. When the gray-scale voltage received by the first conductive layer $M_1$ is from negative to positive, the region of the hole 421 may form a depletion layer 422, i.e., the upper layer of the P—Si may form the depletion layer 422, the depletion layer 422 can be reduce the capacitance of the MIS storage capacitor $C_{st3}$. That is, the MIS storage capacitor $C_{st3}$ of the present embodiment is corresponding to a variable capacitor. Further referring to the C-V (capacitance-voltage gray) curve illustrated in FIG. 9, when the gray-scale voltage is negative, the capacitance of the MIS storage capacitor $C_{st3}$ is $C_1$, when the gray-scale voltage is positive, the capacitance of the MIS storage capacitor $C_{st3}$ is $C_2=C_1*C_0/(C_1+C_0)$, wherein $C_0$ is the capacitance between the depletion layer 422 and the first conductive layer $M_1$. it can be understood that $C_1>C_2$, such as the capacitance of the MIS storage capacitor $C_{st3}$ when receiving a negative gray scale voltage is larger than that of receiving a negative gray scale voltage. Due to a larger leakage of the TFT when the gray voltage is negative, the capacitance of the MIS storage capacitor $C_{st3}$ is increased in the present embodiment to reduce the leakage of the TFT, thereby improving the influence of the leakage of the TFT. Such as to reduce the capacitance difference between the positive or negative gray voltage received by the MIS storage capacitor $C_{st3}$, and further improve the occurrence of the flicker, ensure the performance of the display.

Figure 10:
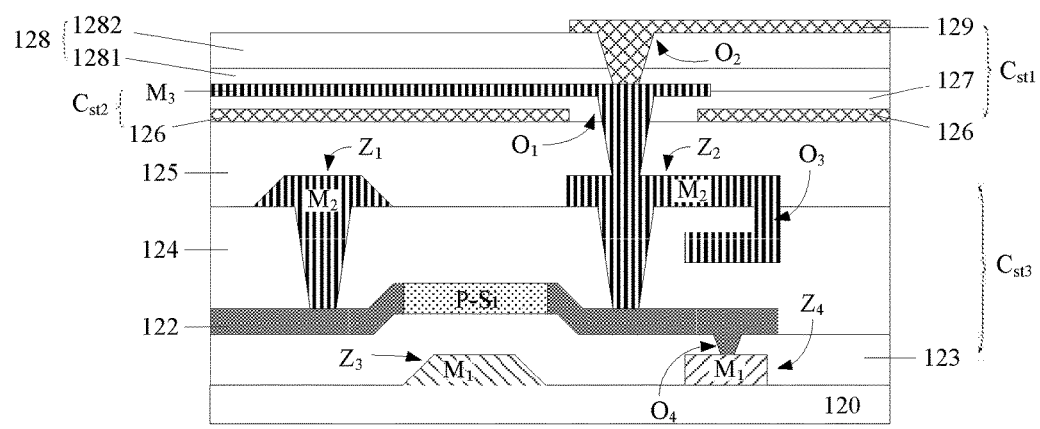
FIG. 10 is a schematic view of the structure of the pixel zone of the array substrate of the fourth embodiment of the present application.

The present invention also provides an array substrate of the fourth embodiment, to distinguish the difference of the description of the above-described embodiment, which the same reference numerals identical the same structural elements. Referring to FIG. 10, the different between the embodiment in FIG. 6 is:

The array substrate 12 further includes a first conductive layer $M_2$ (the portion of the second zone $Z_2$ of the second metal layer $M_2$ formed in the same layer with the source-drain electrode layer of the TFT and disposed in intervals on the dielectric isolation layer 124. The first conductive layer $M_2$ is located under the drain electrode. The dielectric isolation layer 124 has a third contact hole $O_3$ to expose the first conductive layer $M_2$. The first conductive layer $M_2$ is electrically connected to the drain electrode via the third contact hole $O_3$. The array substrate 12 further includes a second conductive layer $M_1$ (the portion of the fourth zone $Z_4$ of the first metal layer $M_1$) formed on the same layer with the gate electrode of the TFT and disposed in intervals on the substrate 120. The second conductive layer $M_1$ is located below the first conductive layer $M_2$. The insulating layer 123 has a fourth contact hole $O_4$ to expose the second conductive layer $M_1$. The second conductive layer $M_1$ is electrically connected to the polycrystalline semiconductor layer 122 via the fourth contact hole $O_4$. By overlapping disposed, the dielectric isolation layer 124 sandwiched by the polycrystalline semiconductor layer 122 and the first conductive layer $M_2$ to form the MIS storage capacitor $C_{st3}$ of the array substrate 12.

In other words, the second zone $Z_2$ of the second metal layer $M_2$ of the present embodiment further includes a portion in the dielectric isolation layer 124. The first metal layer $M_1$ includes a third zone $Z_3$ and a fourth zone $Z_4$ formed in intervals. The third zone $Z_3$ of the first metal layer $M_1$ is the gate electrode of the TFT. The insulating layer 123 has a fourth contact hole $O_4$ to expose the fourth zone $Z_4$ of the first metal layer $M_1$. The fourth zone $Z_4$ of the first metal layer $M_1$ is electrically connected to the polycrystalline semiconductor layer 122 via the fourth contact hole $O_4$. By overlapping disposed, the dielectric isolation layer 124 sandwiched by the polycrystalline semiconductor layer 122 and the second zone $Z_2$ of the second metal layer $M_2$ to form the MIS storage capacitor $C_{st3}$ of the array substrate 12.

Wherein the gate electrode of the TFT is disposed below the polycrystalline semiconductor layer 122, i.e., the present invention is also applicable to a bottom gate pixel design of the array substrate 12.

Figure 11:
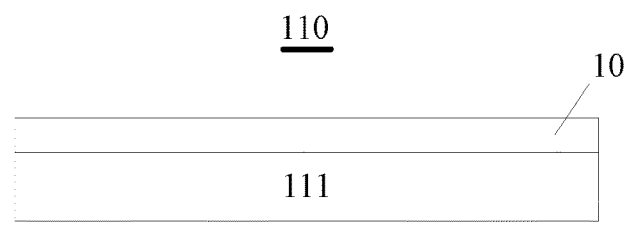
FIG. 11 is a cross-sectional view of the structure of the liquid crystal display device of one embodiment of the present application.

The embodiment of the present invention also provides a liquid crystal display device 110 illustrated in FIG. 11. The liquid crystal display device 110 includes a liquid crystal display panel 10 described above and a light source module 111 to provide the light to the liquid crystal display panel 10. The liquid crystal display panel 10 can use fringe field switching, FFS technology. Since the liquid crystal display device 110 having the design of the array substrate 12 described above, and therefore also has the same advantages.

Above are embodiments of the present application, which does not limit the scope of the present application. Any modifications, equivalent replacements or improvements within the spirit and principles of the embodiment described above should be covered by the protected scope of the invention.

What is claimed is:

1. An array substrate, comprising: a substrate; a TFT, a planarization layer, a common electrode, a passivation layer and a pixel electrode sequentially formed on the substrate characterized in that the array substrate further comprising a touch panel insulation layer and a metal layer sequentially formed between the common electrode and the passivation layer; wherein the metal layer is electrically connected to the pixel electrode and the drain electrode of the TFT separately; by overlapping disposed, the insulation portion of the touch panel insulation layer and the passivation layer sandwiched by the common electrode and the pixel electrode to form the first storage capacitor; and by overlapping disposed, the insulation portion of the touch panel insulation layer sandwiched by the metal layer and the common electrode to form the second storage capacitor;

wherein the planarization layer and the touch panel insulation layer have a first contact hole to expose the drain electrode of the TFT and the metal layer is electrically connected to the drain electrode via the first contact hole; the passivation layer has a second contact hole to expose the metal layer and the pixel electrode is electrically connected to the metal layer via the second contact hole;

wherein the TFT comprises a shading metal layer, a buffer layer, a polycrystalline semiconductor layer, an insulating layer, a gate electrode, a dielectric isolation layer, and a source-drain electrode layer formed by a source electrode and a drain electrode; and wherein the array substrate further comprises a first conductive layer formed in the same layer and disposed in intervals with the gate electrode of the TFT on the insulating layer; wherein the first conductive layer is located below the drain electrode, the dielectric isolation layer has a third contact hole to expose the first conductive layer, the first conductive layer is electrically connected to the drain electrode via the third contact hole;

the array substrate further comprising a second conductive layer formed in the same layer and disposed in intervals with the shading metal layer on the substrate; the second conductive layer is located below the first conductive layer; the buffer layer has a fourth contact hole to expose the second conductive layer, the second conductive layer is electrically connected to the polycrystalline semiconductor layer via the fourth contact hole, by overlapping disposed, the insulation layer sandwiched by the polycrystalline semiconductor layer and the first conductive layer to form a MIS storage capacitor.

2. The array substrate according to claim 1, wherein a portion of the metal layer is corresponding to locate above the TFT, and another portion of the metal layer is in a stripe type and corresponding to formed above the data line of the array substrate.

3. The array substrate according to claim 1, wherein the second conductive layer is across the effective display area of the array substrate, and is electrically connected to the common electrode in the peripheral area of the effective display area.

4. A liquid crystal display panel, comprising the array substrate according to claim 1.

5. A liquid crystal display device comprising a liquid crystal display panel and a light source module to provide the backlight to the liquid crystal display panel, wherein the liquid crystal display panel is according to claim 4.

6. An array substrate, comprising: a substrate; a TFT, a planarization layer, a common electrode, a passivation layer and a pixel electrode sequentially formed on the substrate characterized in that the array substrate further comprising a touch panel insulation layer and a metal layer sequentially formed between the common electrode and the passivation layer; wherein the metal layer is electrically connected to the pixel electrode and the drain electrode of the TFT separately; by overlapping disposed, the insulation portion of the touch panel insulation layer and the passivation layer sandwiched by the common electrode and the pixel electrode to form the first storage capacitor; and by overlapping disposed, the insulation portion of the touch panel insulation layer sandwiched by the metal layer and the common electrode to form the second storage capacitor;

wherein the planarization layer and the touch panel insulation layer have a first contact hole to expose the drain electrode of the TFT and the metal layer is electrically connected to the drain electrode via the first contact hole; the passivation layer has a second contact hole to expose the metal layer and the pixel electrode is electrically connected to the metal layer via the second contact hole;

wherein the TFT comprises a gate electrode, a buffer layer, a polycrystalline semiconductor layer, a dielectric isolation layer, and a source-drain electrode layer formed by a source electrode and a drain electrode; and wherein the array substrate further comprises a first conductive layer formed in the same layer with the source-drain electrode layer of the TFT and disposed in intervals on the dielectric isolation layer, the first conductive layer is located under the drain electrode, the dielectric isolation layer has a third contact hole to expose the first conductive layer, the first conductive layer is electrically connected to the drain electrode via the third contact hole, and the array substrate further comprising a second conductive layer formed on the same layer with the gate electrode of the TFT and disposed in intervals on the substrate, wherein the second conductive layer is located below the first conductive layer, the insulating layer has a fourth contact hole to expose the second conductive layer, the second conductive layer is electrically connected to the polycrystalline semiconductor layer via the fourth contact hole, by overlapping disposed, the dielectric isolation layer sandwiched by the polycrystalline semiconductor layer and the first conductive layer to form a MIS storage capacitor of the array substrate.

7. The array substrate according to claim 6, wherein the second conductive layer is across the effective display area of the array substrate, and is electrically connected to the common electrode in the peripheral area of the effective display area.

8. A liquid crystal display panel, comprising the array substrate according to claim 6.

9. A liquid crystal display device comprising a liquid crystal display panel and a light source module to provide the backlight to the liquid crystal display panel, wherein the liquid crystal display panel is according to claim 8.

* * * * *